(No Model.)
A. W. PAIGE.
SPRING FROG.
No. 412,891.  Patented Oct. 15, 1889.
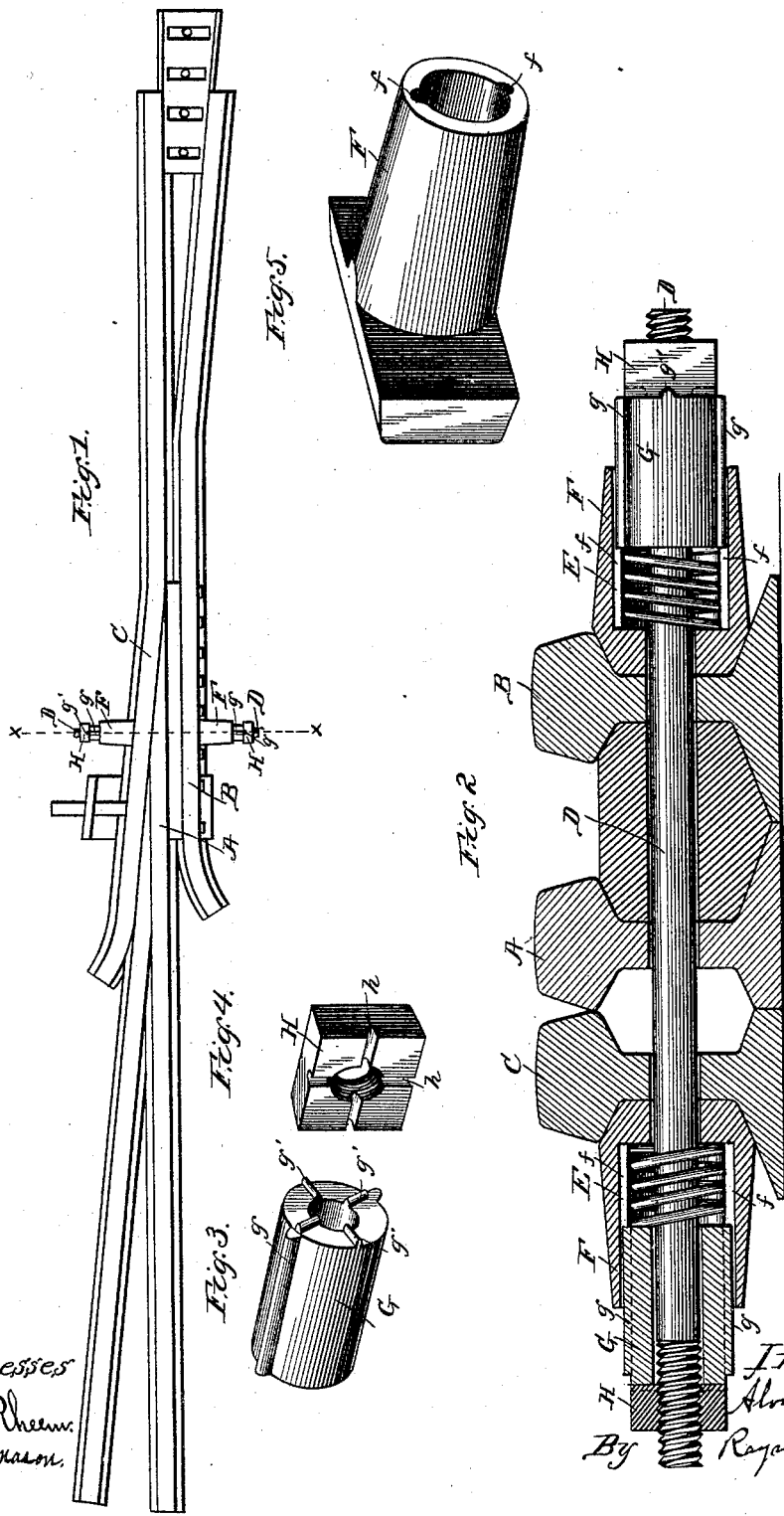

UNITED STATES PATENT OFFICE.

ALONZO W. PAIGE, OF CHICAGO, ILLINOIS.

SPRING-FROG.

SPECIFICATION forming part of Letters Patent No. 412,891, dated October 15, 1889.

Application filed July 12, 1889. Serial No. 317,266. (No model.)

*To all whom it may concern:*

Be it known that I, ALONZO W. PAIGE, of Chicago, in the county of Cook and State of Illinois, have invented certain new and useful Improvements in Spring-Frogs, of which the following is a specification.

My invention relates to spring-frogs, in which, as ordinarily constructed, one of the wing-rails is movable, so that it normally lies in contact with the point-rails, and thus forms an unbroken surface for the passage of the car-wheels on the main track, while it is capable of yielding to permit the passage of the wheel-flanges when running on the side track.

My invention relates particularly to the housing and adjustment of the spring or springs which maintain the movable wing-rail in contact with the point-rails; and it consists in the parts and combinations hereinafter described and claimed.

In the accompanying drawings, Figure 1 is a plan view of a well-known form of spring-frog. Fig. 2 is a cross-section on line $x\,x$, Fig. 1, on an enlarged scale. Figs. 3, 4, and 5 are perspective views of details.

A, Figs. 1 and 2, is the point of the frog, B the fixed wing-rail, and C the yielding wing-rail. The bolt D, with its encircling-springs E E, serves to maintain the yielding contact of rail C with the point A. Said springs E E are contained in casings F F, which are fitted to the sides of the wing-rails, and followers G G are fitted within said casings, being interposed between the springs and the nuts H H on the ends of the bolt D. As shown in the drawings, the springs, cases, and followers are alike, and their action is the same, so that only one need be used if sufficient space for the yielding of the spring-rail be allowed.

To permit the adjustment of the tension of the springs while guarding against the accidental loosening of the nuts H H, the casing F has a groove or grooves $f$, corresponding to ribs $g$ on the follower G, whereby the latter is prevented from rotating. On the face of the follower, which is in contact with the nut H, are projections or ribs $g'\,g'$, which fit into grooves $h\,h$ in the nut H. The ribs $g'$ have sloping sides, so that a wrench applied to the nut will suffice to force the follower G back, the spring E yielding for that purpose, so that the nut may be easily tightened or loosened; but no jar to which the frog is subjected can have any effect to loosen the nuts.

I prefer to groove the casing F and to form a rib on the follower G rather than to form the rib on the casing and groove the follower, as the presence of a rib on the inside of the casing would necessitate the use of a spring of less diameter.

I claim—

The combination, in a spring-frog, of a spring operating the movable rail, a nut for adjusting the tension of said spring, and a non-rotatable follower interposed between said spring and nut, the adjacent surfaces of the follower and nut being provided with corresponding projections and depressions, as described.

ALONZO W. PAIGE.

Witnesses:
J. I. VEEDER,
P. H. T. MASON.